United States Patent Office

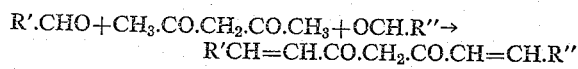

3,194,841
Patented July 13, 1965

3,194,841
PROCESS FOR PREPARING HEPTA-1:6-DIENE-3:5-DIONES
Jan van Alphen, Voorburg, and Hendrik Jacob Johannes Pabon, Vlaardingen, Netherlands, assignors to Lever Brothers Company, New York, N.Y., a corporation of Maine
No Drawing. Filed Aug. 29, 1960, Ser. No. 52,361
Claims priority, application Great Britain, Aug. 31, 1959, 29,623/59
5 Claims. (Cl. 260—590)

This invention relates to the preparation of colouring matters by the condensation of a pentane-2:4-dione with an aldehyde.

According to the invention there is provided a process for the preparation of a colouring matter wherein an aldehyde, the carbonyl double bond of the functional group of which is in conjugation with a carbon-carbon double bond, is condensed with a pentane-2:4-dione at a temperature not greater than 170° C. in the presence of boric oxide, a trialkyl borate having up to 18 carbon atoms in each alkyl group and a primary aliphatic amine.

The condensation may be carried out in the presence of a solvent and fatty acid esters, particularly ethyl acetate, may be used for this purpose. When a solvent is used the condensation can be carried out at temperatures as low as 20° to 60° C.

As examples of aldehydes the carbonyl double bond of the functional group of which is in conjugation with a carbon-carbon double bond there may be mentioned: those aldehydes having a carbonyl double bond in conconjugation with an olefinic double bond, for instance crotonaldehyde; those aldehydes in which the carbonyl double bond is in conjugation with an aryl double bond the functional group of the aldehyde being attached direct to an aryl group, for instance benzaldehyde, salicylaldehyde, p-dimethylaminobenzaldehyde, m-nitrobenzaldehyde, protocatechualdehyde, vanillin, piperonal, veratraldehyde, anisaldehyde, tolualdehyde, thymol aldehyde, and α- and β-naphthaldehyde; those aldehydes in which the carbonyl double bond is in conjugation with both an aryl double bond and an olefinic double bond, for instance cinnamaldehyde; halogenated derivatives of any of these aldehydes; and those aldehydes in which the carbonyl double bond is in conjugation with a double bond of a heterocyclic group having aromatic properties the functional group being linked directly with the heterocyclic group, for instance furfural.

Suitable pentane-2:4-diones are pentane-2:4-dione itself, commonly referred to as acetyl acetone, and 3-methylpentane-2:4-dione.

The trialkyl borates employed in processes according to the invention are those having up to 18 carbon atoms in each alkyl group, examples of which include: trimethyl, triethyl, tri-n-propyl, tri-iso-propyl, tri-n-butyl, tri-iso-butyl, tri-sec-butyl, tri-tert-butyl, tri-n-pentyl, triiso-pentyl, tri-n-octyl, trilauryl, tripalmityl and tristearyl borates. Trialkyl borates in which the alkyl radicals are secondary alcohol radicals tend to favour higher yields of the colouring matter.

The primary aliphatic amines employed in processes according to the invention may be a mono- or poly-amine, such as alkyl monoamine, and alkylene diamines, especially one containing at least three carbon atoms: preferably the amine contains no more than six carbon atoms. Examples are iso-propylamine, iso-butylamine, n-butylamine, n-pentylamine and hexamethylene diamine.

The reactions leading to formation of the colouring matter from acetyl acetone for example, can be summarised thus:

$$R'.CHO + CH_3.CO.CH_2.CO.CH_3 + OCH.R'' \rightarrow$$
$$R'CH=CH.CO.CH_2.CO.CH=CH.R''$$

It will usually be convenient to employ only one aldehyde (that is R' and R'' will be identical), so that a symmetrical product will be obtained. In such an instance, the pentane-2:4-dione and the aldehyde will be employed in a molar ratio of 1:2. For the preparation of asymmetrical products (that is, those in which R' and R'' are different), the dione can first be reacted with an equimolar proportion of one aldehyde, R'CHO; and subsequently the product thus obtained can be reacted with an equimolar proportion of the other aldehyde, R''CHO.

The molar ratio of boric oxide to aldehyde is suitably from 1:8 to 1:1, most suitably about 1:4.

In practice the primary aliphatic amine is added gradually during the course of the reaction. The molar ratio of amine to aldehyde employed is preferably from 1:10 to about 1:1. A ratio of about 1:4 is very suitable.

The molar ratio of trialkyl borate to aldehyde employed is preferably in the range 1:4 to 10:1. When a solvent such as a fatty acid ester is employed, the molar ratio of trialkyl borate to aldehyde is very suitably about 2:1.

The products of the reaction are fat-soluble and are stable at high temperatures: they can be used as colouring agents for food, and can be incorporated in foodstuffs such as frying fats, potato chips, dried soups, curries and piccalilli.

The following examples illustrate the invention.

*Example 1*

Tri-n-butyl borate was prepared from 25 g. of boric acid (0.4 mol) and 250 ml. of n-butanol (2.7 mol). 26.4 g. of cinnamaldehyde (0.2 mol), the reaction product of 10 g. of acetyl acetone (0.1 mol) and 5 g. of boric oxide (0.07 mol) (obtained by stirring the mixture until a dry paste was formed), and 100 ml. of ethyl acetate, were added with stirring to the tri-n-butyl borate maintained at a temperature of 50° C. and the mixture was stirred for a further 30 minutes. A slightly turbid solution was obtained.

While the reaction mixture was kept at 40° C. on a water bath, 4 ml. of n-butylamine were added dropwise, with continuous stirring, at the rate of 1 ml. every 10 minutes, stirring being continued for a further 4 hours. After standing for 12 hours the mixture was stirred with 400 ml. of 0.3 N hydrochloric acid for an hour and then filtered to remove solid product. The aqueous layer was separated, and extracted with ethyl acetate. The combined ethyl acetate fractions were then dried, the solvent was distilled off, and the residue was combined with that obtained by the filtration. Recrystallization twice from ethyl acetate gave 9.4 g. of brown needle-shaped crystals of 1:11-diphenyl-undeca-1:3:8:10-tetrane-5:7-dione with a melting point of 184°–185° C. (Yield 28.7%. Found: C=83.92%, H=6.06% and O=10.10%; $C_{23}H_{20}O_2$ requires C=84.15%, H=6.10% and

O=9.75.)

*Example 2*

60 g. of vanillin (0.4 mol) were dissolved in 200 ml. of ethyl acetate at room temperature (20° C.). To this solution were added 200 ml. tri-n-butyl borate (0.8 mol), and the reaction product of 20 g. of acetyl acetone (0.2 mol) and 10 g. of boric oxide (0.14 mol) (obtained by stirring the mixture for about 20 minutes until a dry paste was formed). After stirring for five minutes 4 ml. of n-butylamine were added dropwise at the rate of 1 ml. every five minutes with constant stirring. The stirring was continued for 4 hours. After standing for 12 hours 20 ml. of 6 N hydrochloric acid were added to the reaction mixture, which had been diluted with tepid water (50° C.) to a total volume of 300 ml., and the mixture was stirred for 30 minutes. The reaction mixture was then shaken with 400 ml. of ethyl acetate, after which the aqueous layer was separated. The ethyl acetate fraction was washed with water until acid-free and then part of the solvent was distilled off under reduced pressure until the total volume remaining was about 150 ml. 100 ml. of methanol were added to this residue and, after seeding and keeping the solution for 3 hours at a temperature of 4° C., the precipitate formed was recovered by filtration. The precipitate was washed with cold methanol until the washing liquid was a lemon-yellow colour. After drying at 100° C., 50 g. (68% of the theoretical amount) of orange-yellow to orange-red crystals of curcumin were obtained with a melting point of 176°–178° C. From the mother-lye and the washing liquid a further 4 g. of curcumin with a melting point of 174°–176° C. was recovered after evaporating part of the solvent under vacuum. (Yield 72%.)

The advantageous effects of the trialkyl borate and primary aliphatic amine were demonstrated by carrying out experiments employing the same reactants as in the above example with the exception of the borate and amine. The comparative test was carried out as follows:

60 parts by weight of vanillin, 20 parts by weight of acetyl acetone and 28.6 parts by weight of boric oxide were heated. The reaction mixture formed was dissolved in 1 N alkali, acidified and filtered. Crude curcumin was obtained from the dry residue of filtration by extracting the residue with ether. The yield obtained was only about 1%.

Example 3

92 g. of tri-iso-butyl borate (0.4 mol), 30.4 g. of vanillin (0.2 mol) and 100 ml. of ethyl acetate were warmed to 20° C. and stirred until a homogeneous solution was formed. The reaction product obtained by stirring a mixture of 11.4 g. of 3-methylpentane-2:4-dione (0.1 mol) and 5 g. boric oxide (0.07 mol) until a dry paste was formed, was added to this solution. Then 4 ml. of isobutylamine were added dropwise, as described in Example 1, and the mixture was stirred for 4 hours. After standing for 12 hours, 250 ml. of 0.3 N hydrochloric acid were added with vigorous stirring, which was continued for 2 hours. Isolation of the solid product as previously described, followed by recrystallisation from methanol four times gave 14 g. of orange-red crystals of 1:7-di[3-methoxy-4-hydroxyphenyl]-4-methylheptane-1:6-diene-3:5-dione with a melting point of 175.5°–176.5° C. (Yield 36%. Found: C=68.72%, H=5.73% and O=25.18%; $C_{22}H_{22}O_6$ requires C=69.11%; H=5.76% and

O=25.13%.)

Example 4

21.2 g. of freshly distilled benzaldehyde (0.2 mol), the reaction product of 10 g. of acetyl acetone (0.1 mol) and 5 g. of boric oxide (0.07 mol), and 100 ml. of ethyl acetate were added with stirring at 40° C. to 92 g. of tri-n-butyl borate (0.4 mol). After continuous stirring for a further 15 minutes, a somewhat turbid solution was obtained.

4 ml. of n-butylamine were added dropwise with continuous stirring, at the rate of 1 ml. every 10 minutes. After constant stirring for 4 hours, the reaction mixture was allowed to stand for two days. The dark orange mixture formed was stirred with 300 ml. of 0.3 N hydrochloric acid for 2 hours. The ethyl acetate layer was then separated, and the aqueous layer was extracted with ethyl acetate. The combined ethyl acetate fractions were washed until acid-free, after which the ethyl acetate was evaporated. After recrystallising three times from ethanol, the residue gave 6.4 g. of greenish-yellow needles of 1:7-diphenylheptane-1:6-diene-3:5-dione with a melting point of 140°–140.5° C. (Yield 23%. Found: C=82.25%, H=5.70% and O=12.00%; $C_{19}H_{16}O_2$ requires C=82.61%, H=5.80% and O=11.59%.)

Example 5

29.8 g. of p-dimethylaminobenzaldehyde (0.2 mol), the reaction product of 10 g. of acetyl acetone (0.1 mol) and 5 g. of boric oxide (0.7 mol), and 100 ml. of ethyl acetate were added with stirring at 40° C. to 92 g. of tri-n-butyl borate (0.4 mol). After stirring for a further 10 minutes, 4 ml. of n-butylamine were added dropwise, with continuous stirring, at the rate of 1 ml. every 10 minutes, and stirring was continued for a further 4 hours, after which the reaction mixture was allowed to stand for 12 hours. The purple mixture formed was stirred with 300 ml. of 0.3 N hydrochloric acid at 50° C. for an hour, the clear aqueous layer was then separated, and the ethyl acetate fraction was filtered to recover the precipitate. The precipitate was dried and recrystallised twice from N:N-dimethylformamide and gave 13 g. of purple needles of 1:7-di-[p-dimethylaminophenyl]-heptane-1:6-diene-3:5-dione with a melting point of 206°–207° C. (Yield 30%. Found: C=75.72%, H=7.13%, O=8.97% and N=7.70%; $C_{23}H_{26}O_2N_2$ requires C=76.24%; H=7.18%, O=8.84% and N=7.73%.)

Example 6

A mixture of 60 g. of vanillin (0.4 mol), 200 ml. of tri-n-butyl borate (0.8 mol) and the reaction product of 20 g. of acetyl acetone (0.2 mol) and 10 g. of boric oxide (0.14 mol) (obtained by stirring these compounds for about 20 minutes until a dry paste was formed) was heated to 110° C. with constant stirring. 4 ml. of n-pentylamine were then added dropwise at the rate of 1 ml. every 5 minutes, the stirring being continued for 4 hours after completing the addition. After standing for 12 hours, 10 ml. of 6 N hydrochloric acid were added to the reaction mixture, to which had been added 100 ml. of tepid water (50° C.). The mixture was stirred for 30 minutes and subsequently shaken with 400 ml. of ethyl acetate, the isolation of the solid product being carried out in the same way as described in Example 2.

A total yield of 34 g. (45% of theoretical) of curcumin was obtained.

Example 7

14 g. of crotonaldehyde (0.2 mol), the reaction product of 10 g. of acetyl acetone (0.1 mol) and 5 g. of boric oxide (0.07 mol), and 100 ml. of ethyl acetate were added with stirring at 40° C. to 92 g. of tri-n-butyl borate (0.4 mol). After continuous stirring for a further 15 minutes, a somewhat turbid solution was obtained.

4 ml. of n-butylamine were added dropwise, with continuous stirring, at the rate of 1 ml. every 10 minutes. After constant stirring for 4 hours, the reaction mixture was allowed to stand for 2 days. The mixture formed was stirred with 300 ml. of 0.3 N hydrochloric acid for 2 hours. The ethyl acetate layer was then separated, and the aqueous layer was extracted with ethyl acetate. The combined ethyl acetate fractions were washed until acid-free, after which the ethyl acetate was evaporated. After recrystalising three times from methanol, the residue gave 4.1 g. of lemon-yellow needles of 1:7-dipropenyl-heptane-1:6-diene-3:5-dione with a melting point of 148°–148.5° C. (Yield 2%. Found: C=75.44%, H=7.84%, and O=16.92%; $C_{13}H_{16}O_2$ requires C=76.40%, H=7.91% and O=15.68%.)

Example 8

The process according to Example 2 was repeated using 0.8 mol of trimethyl borate instead of tri-n-butyl borate. The total yield of curcumin obtained was 46.4 g. (62.7% of theoretical).

Example 9

The process according to Example 2 was repeated using 0.8 mol of triethyl borate instead of tri-n-butyl borate. The total yield of curcumin obtained was 52.4 g. (70.7% of theoretical).

Example 10

The process according of Example 2 was repeated using 0.8 mol of tri-n-propyl borate instead of tri-n-butyl borate. The total yield of curcumin obtained was 51.1 g. (69% of theoretical).

Example 11

The process according to Example 2 was repeated using 0.8 mol of tri-sec-propyl borate instead of tri-n-butyl borate. The total yield of curcumin obtained was 59.3 g. (80% of theoretical).

Example 12

The process according to Example 2 was repeated using 0.8 mol of tri-sec-butyl borate instead of tri-n-butyl borate. The total yield of curcumin obtained was 57.8 g. (78% of theoretical).

Example 13

The process according to Example 2 was repeated using 0.8 mol of tri-tert-butyl borate instead of tri-n-butyl borate. The total yield of curcumin obtained was 43 g. (58% of theoretical).

Example 14

The process according to Example 2 was repeated using 0.8 mol of tri-isobutyl borate instead of tri-n-butyl borate. The total yield of curcumin obtained was 51.1 g. (69% of theoretical).

Example 15

The process according to Example 2 was repeated using 0.8 mol of tri-n-pentyl borate instead of tri-n-butyl borate. The total yield of curcumin obtained was 43.7 g. (59% of theoretical).

Example 16

The process according to Example 2 was repeated using 0.8 mol of tri-iso-pentyl borate instead of tri-n-butyl borate. The total yield of curcumin obtained was 48.9 g. (66% of theoretical).

Example 17

The process according to Example 2 was repeated using 0.8 mol of tri-n-octyl borate instead of tri-n-butyl borate. The total yield of curcumin obtained was 42.2 g. (57% of theoretical).

Example 18

The process according to Example 2 was repeated using 0.8 mol of trilauryl instead of tri-n-butyl borate. The total yield of curcumin obtained was 22.2 g. (30% of theoretical).

Example 19

The process according to Example 2 was repeated using 0.8 mol of tripalmityl borate instead of tri-n-butyl borate. The total yield of curcumin obtained was 14.1 g. (16% of theoretical).

What is claimed is:

1. In the condensation between (1) an aldehyde wherein the carbonyl double bond of the functional group is in conjugation with a carbon-carbon double bond and (2) a pentane-2:4-dione wherein reaction occurs between the aldehyde group of said aldehyde and a terminal group of said dione to yield a hepta-1:6-diene-3:5-dione, the improvement which comprises carrying out the condensation at a temperature not greater than 170° C. in the presence of boric oxide, a trialkyl borate having up to 18 carbon atoms in each alkyl group and a primary aliphatic amine selected from the group consisting of alkyl monoamines and alkylene diamines containing at least 3 and not more than 6 carbon atoms, the molar ratio of boric oxide to aldehyde being from 1:8 to 1:1, the molar ratio of amine to aldehyde being from 1:10 to about 1:1, the molar ratio of trialkyl borate to aldehyde being from 1:4 to 10:1.

2. The condensation method of claim 1 carried out in the presence of ethyl acetate.

3. The condensation method of claim 1 carried out at a temperature of from 20° to 60° C. and in the presence of ethyl acetate.

4. A process which comprises condensing: (1) an aldehyde selected from the group consisting of crotonaldehyde, benzaldehyde, salicylaldehyde, p-dimethylaminobenzaldehyde, m-nitrobenzaldehyde, protocatechualdehyde, vanillin, piperonal, veratraldehyde, anisaldehyde, tolualdehyde, thymol aldehyde, naphthaldehyde, cinnamaldehyde, and furfural with (2) a pentane-2:4-dione selected from the group consisting of acetyl acetone and 3-methyl-pentane-2:4-dione at a temperature not greater than 170° C. in the presence of boric oxide, a trialkyl borate having up to 18 carbon atoms in each alkyl group and a primary aliphatic amine selected from the group consisting of alkyl monoamines and alkylene diamines containing at least 3 and not more than 6 carbon atoms, the molar ratio of boric oxide to aldehyde being from 1:8 to 1:1, the molar ratio of amine to aldehyde being from 1:10 to about 1:1, the molar ratio of trialkyl borate to aldehyde being from 1:4 to 10:1.

5. A process for the preparation of curcumin which comprises condensing vanillin with acetyl acetone at a temperature not greater than 170° C. in the presence of boric oxide, a trialkyl borate having up to 18 carbon atoms in each alkyl group and a primary aliphatic amine selected from the group consisting of alkyl monoamines and alkylene diamines containing at least 3 and not more than 6 carbon atoms, the molar ratio of boric oxide to aldehyde being from 1:8 to 1:1, the molar ratio of amine to aldehyde being from 1:10 to about 1:1, the molar ratio of trialkyl borate to aldehyde being from 1:4 to 10:1.

References Cited by the Examiner

UNITED STATES PATENTS

| 2,230,591 | 2/41 | Fischer et al. | 260—593 X |
| 2,499,172 | 2/50 | Smith | 260—593 |
| 2,516,729 | 7/50 | Smith | 260—593 X |

OTHER REFERENCES

Pavolini et al.: Chem. Abstracts, volume 45, pages 9004–5 (1951).

LORRAINE A. WEINBERGER, *Acting Primary Examiner.*

LEON ZITVER, *Examiner.*